(12) United States Patent
Hsieh

(10) Patent No.: US 6,668,604 B1
(45) Date of Patent: Dec. 30, 2003

(54) AUTOMOBILE LOCK

(76) Inventor: Hui-Hua Hsieh, P.O. Box 90, Tainan City (TW)

( * ) Notice: Subject to any disclaimer, the term of this patent is extended or adjusted under 35 U.S.C. 154(b) by 0 days.

(21) Appl. No.: 10/419,953

(22) Filed: Apr. 22, 2003

(51) Int. Cl.[7] .............................................. B60R 25/02
(52) U.S. Cl. ........................................ 70/209; 70/226
(58) Field of Search ........................ 70/209–212, 225, 70/226, 237, 238

(56) References Cited

U.S. PATENT DOCUMENTS

| | | | | | |
|---|---|---|---|---|---|
| 4,848,110 A | * | 7/1989 | Kuo | .......................... | 70/38 C |
| 4,949,561 A | * | 8/1990 | Solow et al. | ................. | 70/209 |
| 5,022,246 A | * | 6/1991 | Wang | .......................... | 70/209 |
| 5,031,428 A | * | 7/1991 | Jan et al. | ...................... | 70/209 |
| 5,040,388 A | * | 8/1991 | Chen | .......................... | 70/209 |
| 5,113,672 A | * | 5/1992 | Wang | .......................... | 70/209 |
| 5,121,617 A | * | 6/1992 | Chen | .......................... | 70/209 |
| 5,131,245 A | * | 7/1992 | Chen | .......................... | 70/209 |
| 5,174,138 A | * | 12/1992 | Shen | .......................... | 70/209 |
| 5,179,849 A | * | 1/1993 | Wang | .......................... | 70/209 |
| 5,257,518 A | * | 11/1993 | Hsieh | .......................... | 70/209 |
| 5,284,037 A | * | 2/1994 | Chen et al. | .................... | 70/209 |
| 5,566,561 A | * | 10/1996 | Hucknall | ..................... | 70/209 |
| 5,678,433 A | * | 10/1997 | Riccitelli | ..................... | 70/209 |
| 6,282,930 B1 | * | 9/2001 | Strauss et al. | ................. | 70/209 |
| 6,334,345 B1 | * | 1/2002 | Lee | .............................. | 70/209 |
| 6,349,580 B1 | * | 2/2002 | Kuo | ............................. | 70/209 |
| 6,378,343 B1 | * | 4/2002 | Lee | .............................. | 70/209 |

* cited by examiner

Primary Examiner—Suzanne Dino Barrett

(57) ABSTRACT

An automobile lock has a body, an ejecting rod and a retaining rod. When in using, use a key to rotate a lock core to withdraw the ejecting rod inwardly to make the retaining rod disengaged from a locating pin and urged outwardly by a spring to form a gap for allowing a steering wheel rim to be received therein and embraced by a holding member of the body and a retaining member of the retaining rod, and then pull the ejecting rod outwardly to be fixed at a rear end of the body, thus providing a secure lock on the steering wheel. When not in use, rotate the lock core to pull the retaining rod outwardly for removing the automobile lock from the steering wheel, and then withdraw the retaining rod into a housing, thereby reducing the automobile lock to a minimum dimension convenient for storage.

5 Claims, 7 Drawing Sheets

AUTOMOBILE LOCK

BACKGROUND OF THE INVENTION

1. Field of the Invention

This invention relates to an automobile lock, particularly to one having a body, an ejecting rod and a retaining rod. When in using, use a key to rotate a lock core to shrink a locking pin from a rear engagement hole of the ejecting rod to be in an unlocked status for allowing the ejecting rod to be withdrawn into a chamber of the body to make a locating pin that is contained in a pin hole of the body depressed downwards by an ejecting pin of the ejecting rod and disengaged from one of a plurality of engagement grooves of the retaining rod so that the retaining rod may be urged outwardly under the resilience of a spring so as to form a gap between a retaining member of the retaining rod and a holding member of the body for allowing a rim of an automobile steering wheel to be received in the holding member, and then push the retaining rod inwardly further until the retaining member is touched against the rim of the automobile steering wheel so that the retaining rod and the holding member may coact to embrace the rim of the automobile steering wheel therein, finally pull the ejecting rod outwardly to make the locking pin engaged in a front engagement hole of the ejecting rod to fix the ejecting rod in place without sliding back into the chamber of the body, thus providing a secure lock on the automobile steering wheel.

When not in use, firstly only to rotate the lock core to be in an unlocked status for allowing the ejecting rod to be withdrawn into the chamber of the body and pushed inwardly further to make the locating pin depressed downwards by the ejecting pin of the ejecting rod and disengaged from one of the plurality of engagement grooves of the retaining rod so that the retaining rod may be urged outwardly under the resilience of the spring so as to form the gap between the retaining member and the holding member for allowing the automobile lock to be removed from the automobile steering wheel, and then withdraw the retaining rod into a housing of the body, thereby reducing the automobile lock to a minimum dimension only occupying little space convenient for storage.

2. Description of the Prior Art

Generally speaking, as shown in FIG. 1, a known conventional automobile lock 1 mainly has a body 10 and a telescoping rod 11. The body 10 has a hook 100 formed thereon, a locking housing 101, a lock core 102 contained therein, and a passage 103 disposed therein. The telescoping rod 11 capable of being extended into the passage 103 of the body 10 has a hook 110 formed thereon in a direction opposite to the hook 100 of the body 10, and a plurality of annular grooves 111 formed thereon. When in use, the telescoping rod 11 can be pulled outwards relative to the body to make the hooks 100, 110 of the body 10 and the telescoping rod 11 respectively hooked on an automobile steering wheel to limit the rotation of the automobile steering wheel to achieve an effect of anti-theft. When not in use, the telescoping rod 11 can be withdrawn into the body 10 to shorten the length of the conventional automobile lock 1; however, the whole length of the conventional automobile lock 1 in a withdrawn status is still too long for storage and the dimension of the conventional automobile lock 1 occupies too much space inconvenient for carrying.

SUMMARY OF THE INVENTION

The main purpose of the invention is to offer an automobile lock convenient in operation and capable of being withdrawn to reduce its whole dimension convenient for storage.

The main feature of the invention is to provide an automobile lock including:

a body having a holding member disposed at a front end thereof, a housing disposed at an upper portion thereof, a pin hole disposed therein, a chamber disposed therein and a locking seat disposed at a rear portion thereof, the housing provided with a passage disposed therein and extending through a front end thereof as well as an opening disposed at an upper portion thereof in communication with the passage, the pin hole aligned with the opening of the housing and communicating with the passage of the housing, a first spring and a locating pin contained in the pin hole, the chamber extending through a rear end of the body and provided with a through hole disposed at a front end thereof in communication both with the chamber and the pin hole, the locking seat provided with a compartment disposed therein as well as a lock hole disposed at a sidewall thereof in communication with the chamber, a lock core contained in the compartment, a second spring and a locking pin contained in the lock seat;

an ejecting rod capable of being extended into the chamber of the body, and having an ejecting pin disposed at a front end thereof and two engagement holes each respectively disposed adjacent the front end and a rear end of a sidewall thereof; and, a retaining rod capable of being extended into the passage of the housing, and having a rod body and a retaining member disposed at a front end of the rod body, the rod body provided with a plurality of engagement grooves formed thereon as well as a locating engagement groove formed adjacent a rear end thereof, a third spring contained in the passage of the housing for urging against the rear end of the rod body.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
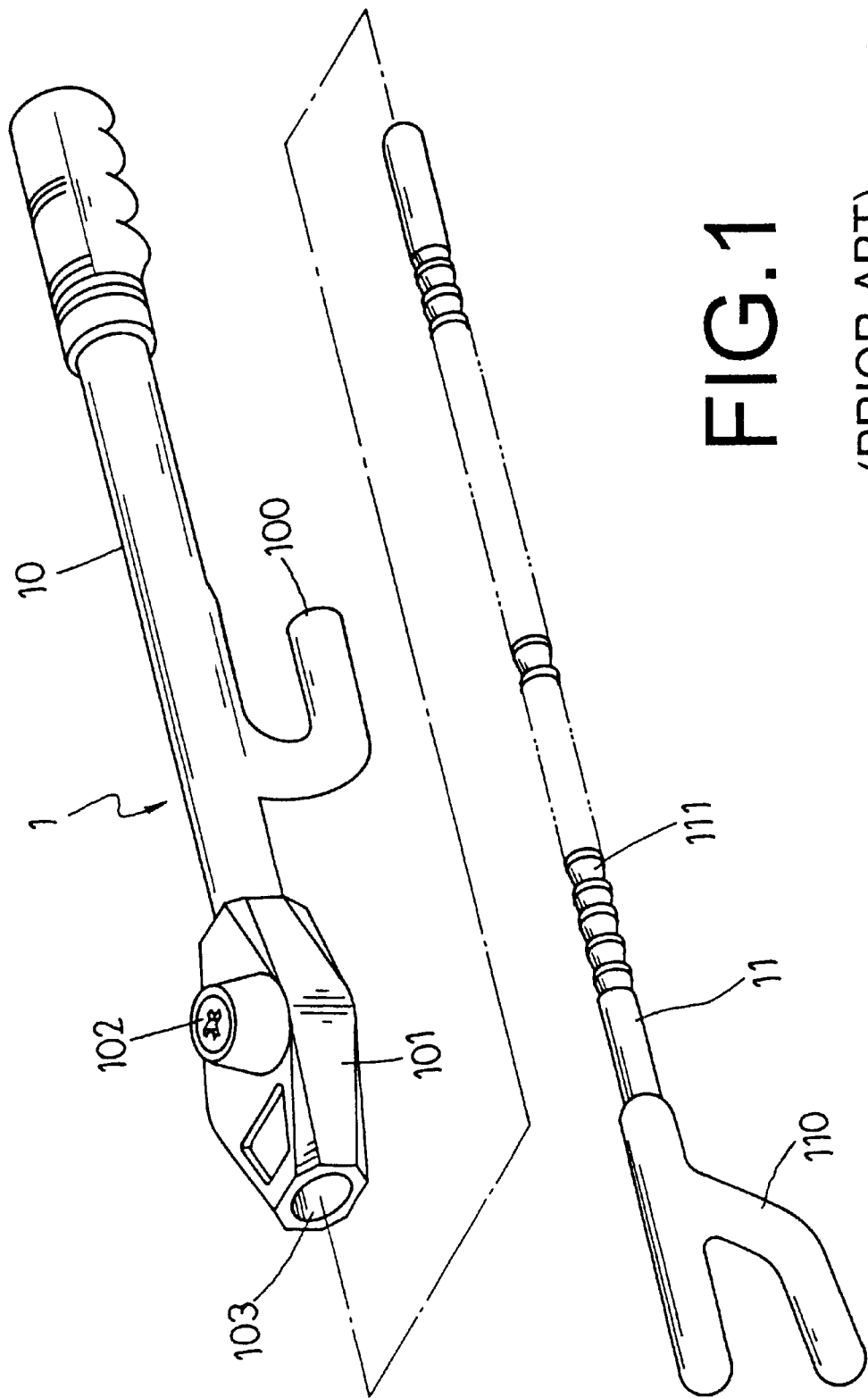
FIG. 1 is a perspective view of a known conventional automobile steering wheel lock.
Figure 2:
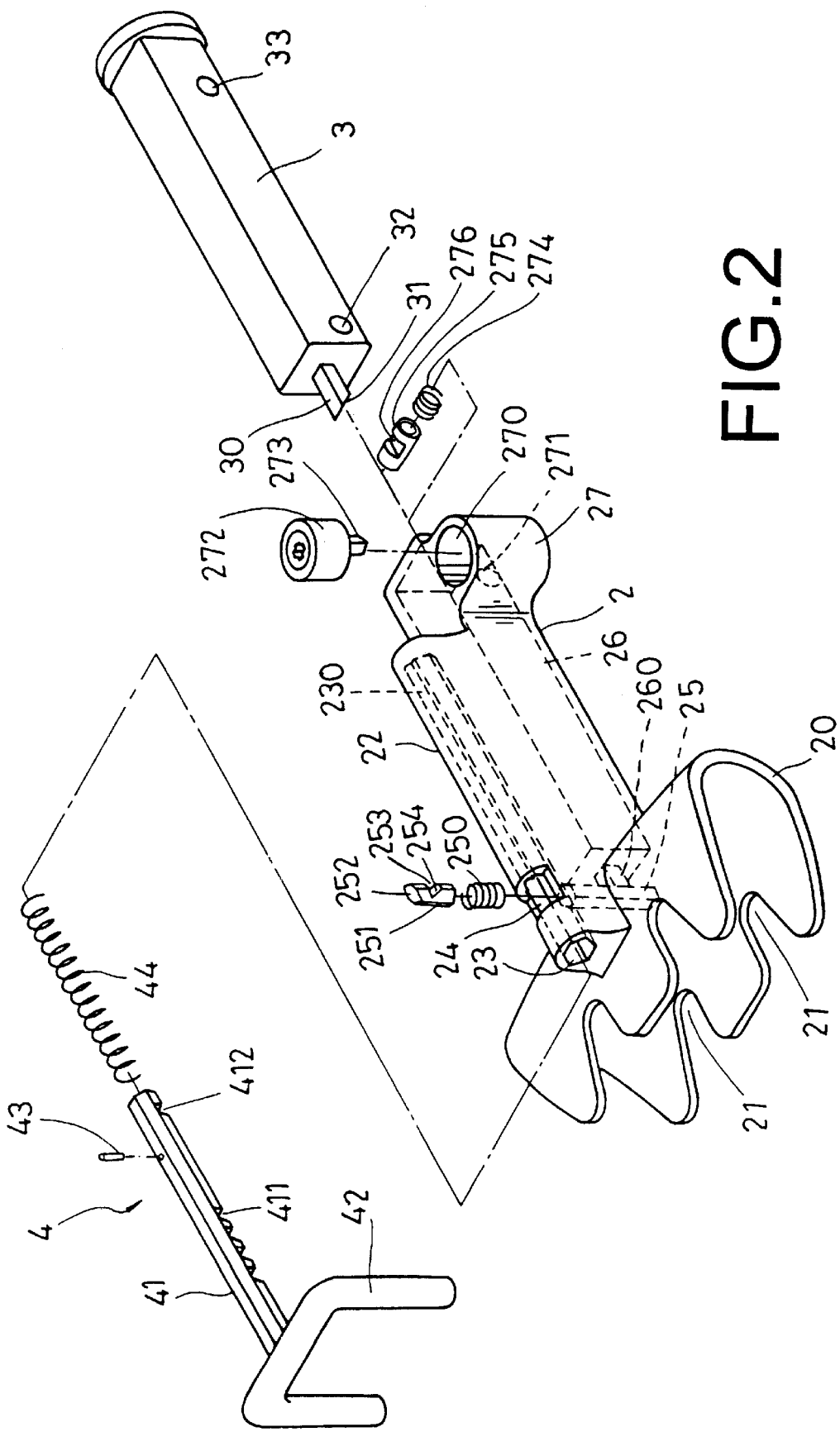
FIG. 2 is an exploded perspective view of an automobile lock in the present invention.
Figure 4:
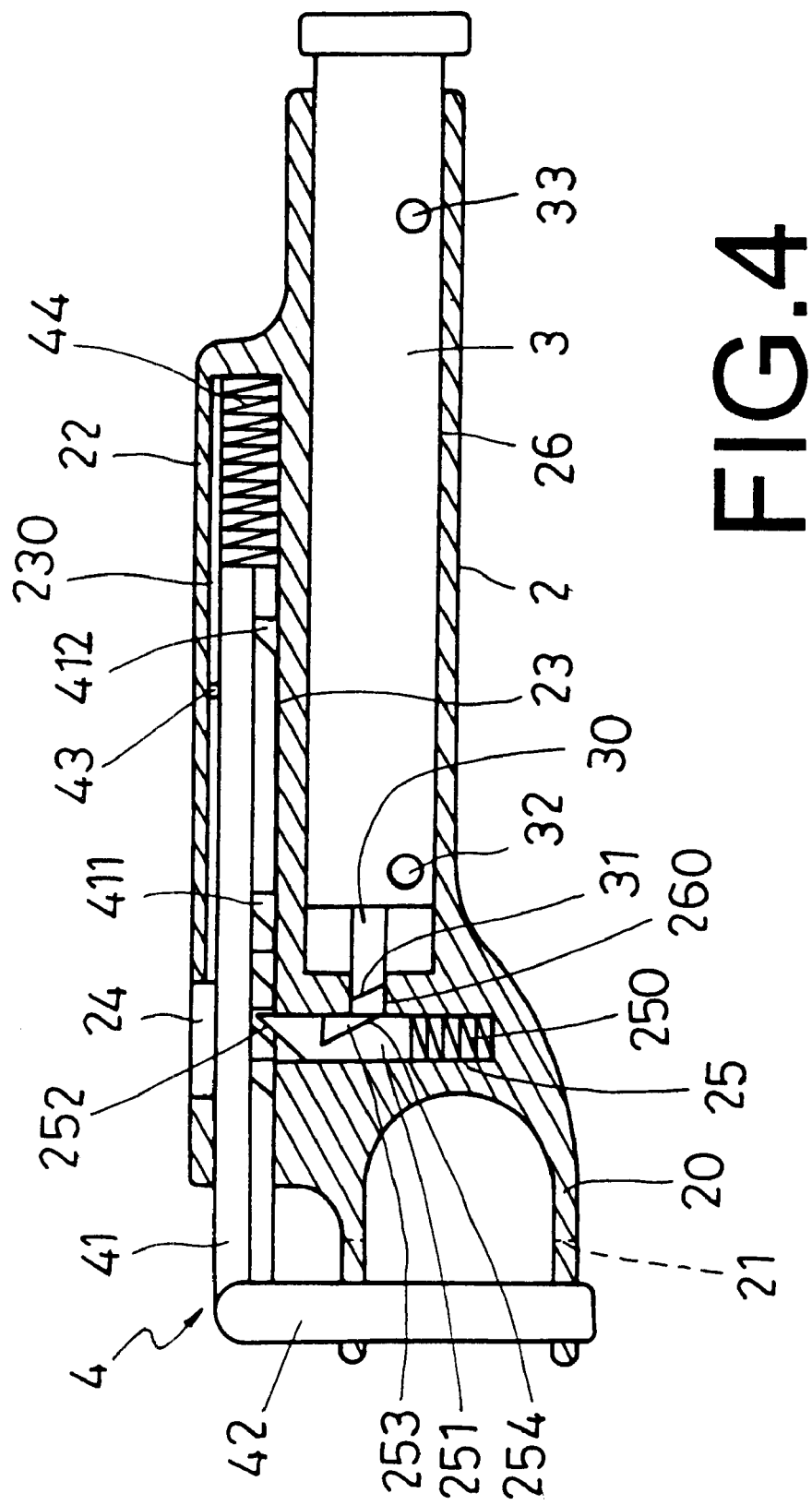
FIG. 4 is a sectional view of the automobile lock in the present invention, showing the ejecting rod and the retaining rod both being withdrawn in the body.

A preferred embodiment of an automobile lock in the present invention, as shown in FIGS. 2 and 4, mainly has a body 2, an ejecting rod 3 and a retaining rod 4.

The body 2 has a holding member 20 disposed at a front end thereof, a housing 22 disposed at an upper portion thereof, a pin hole 25 disposed therein, a chamber 26 disposed therein and a locking seat 27 disposed at one side of a rear portion thereof. The holding member 20 is provided with open slots 21 formed thereon. The housing 22 is provided with a passage 23 disposed therein and extending through a front end thereof as well as an opening 24 disposed at an upper portion thereof in communication with the passage 23. A slide way 230 is disposed in one section of the passage 23 that is located behind the opening 24 of the housing 22. The pin hole 25 is aligned with the opening 24 of the housing 22 in communication with the passage 23. A first spring 250 and a locating pin 251 are contained in the pin hole 25. The locating pin 251 has a top provided with a sloped surface 252 at one side thereof and a sidewall provided with an engagement notch 253 disposed thereon. The engagement notch 253 is provided with an inclined cut face 254 formed therein. The chamber 26 extends through a rear end of the body 2 and is provided with a through hole 260 disposed at a front end thereof in communication both with the chamber 26 and the pin hole 25. The locking seat 27 is provided with a compartment 270 disposed therein as well as a lock hole 271 disposed at a sidewall thereof in communication with the chamber 26. A lock core 272 is contained in the compartment 270, and has a bottom provided with an actuating block 273 protruded therefrom. A second spring 274 and a locking pin 275 are capable of being inserted into the locking seat 27 via the lock hole 271. The locking pin 275 is provided with an engagement slot 276 disposed thereon.

The ejecting rod 3 capable of being extended into the chamber 26 of the body 2 has an ejecting pin 30 disposed at a front end thereof and a front engagement hole 32 and a rear engagement hole 33 respectively disposed adjacent the front end and a rear end of a sidewall thereof. The ejecting pin 30 has a front end designed to be an inclined plane 31 for corresponding to the inclined cut face 254 of the engagement notch 253 of the locating pin 251.

The retaining rod 4 capable of being extended into the passage 23 of the housing 22 has a rod body 41 and a retaining member 42 in an inverted U shape disposed at a front end of the rod body 41. The rod body 41 is provided with a plurality of engagement grooves 411 formed thereon, a locating engagement groove 412 formed adjacent a rear end thereof and a projection 43 disposed thereon. A third spring 44 is contained in the passage 23 of the housing 22 for urging against the rear end of the rod body 41.

Figure 3:
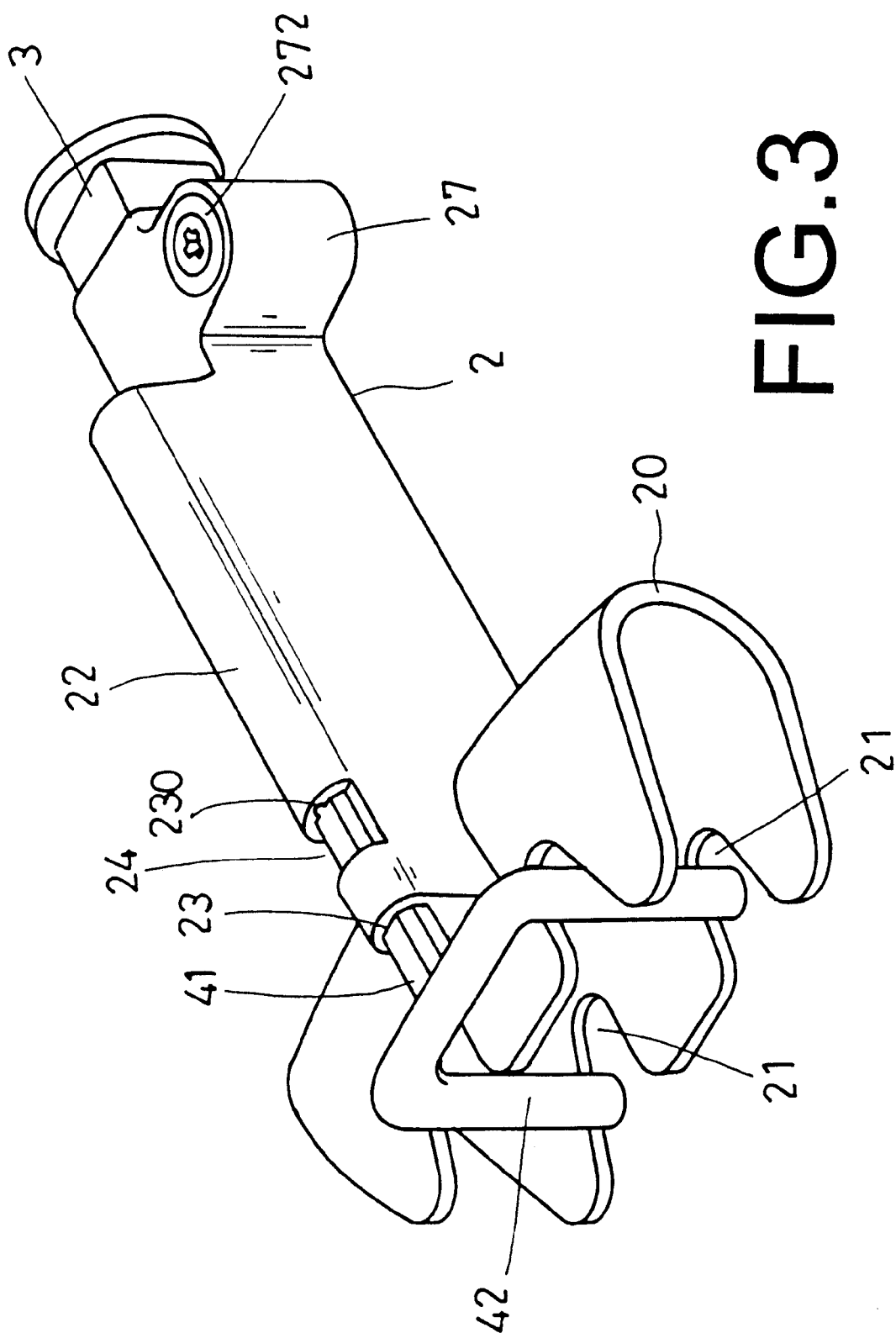
FIG. 3 is a perspective view of the automobile lock in the present invention, showing an ejecting rod and a retaining rod both being withdrawn in a body.

In assembling, referring to FIGS. 2, 3 and 4, firstly insert the second spring 274 and the locking pin 275 into the locking seat 27 via a bore formed at the rear end of the chamber 26 and via the lock hole 271 of the locking seat 27, and then mount the lock core 272 into the compartment 270 of the locking seat 27 with the actuating block 273 of the lock core 272 engaged with the engagement slot 276 of the locking pin 275 so that the locking pin 275 may be extended into or shrunk out of the chamber 26 by the actuating block 273 under the rotation of the lock core 272. Secondly, extend the ejecting rod 3 through the chamber 26 with the ejecting pin 30 of the ejecting rod 3 extended into the through hole 260 of the chamber 26 and with the locking pin 275 engaged in the rear engagement hole 33 of the ejecting rod 3, and then insert the first spring 250 and the locating pin 251 into the pin hole 25 via the opening 24 of the housing 22. Thirdly, insert the third spring 44 into the passage 23 of the housing 22, extend the rod body 41 of the retaining rod 4 into the passage 23, fix the projection 43 securely on the rod body 41 of the retaining rod 4 via the opening 24 of the housing 22 such that the projection 43 is allowed to slide along the slide way 230 of the passage 23, and then push the retaining rod 4 inwardly further to compress the third spring 44 to make the locating pin 251 engaged in one of the plurality of engagement grooves 411 of the rod body 41 so as to withdraw the rod body 41 in the passage 23 with the retaining member 42 of the retaining rod 4 positioned in the open slots 21 of the holding member 20, by which an assemblage of the whole structure of the automobile lock in the present invention is completed.

When the automobile lock of the present invention is applied on an automobile steering wheel 90, referring to FIGS. 4, 5, 6 and 7, firstly use a key (not shown) to rotate the lock core 272 to force the actuating block 273 to shrink the locking pin 275 to compress the second spring 274 so that the locking pin 275 may be disengaged from the rear engagement hole 33 of the ejecting rod 3.

Figure 5:
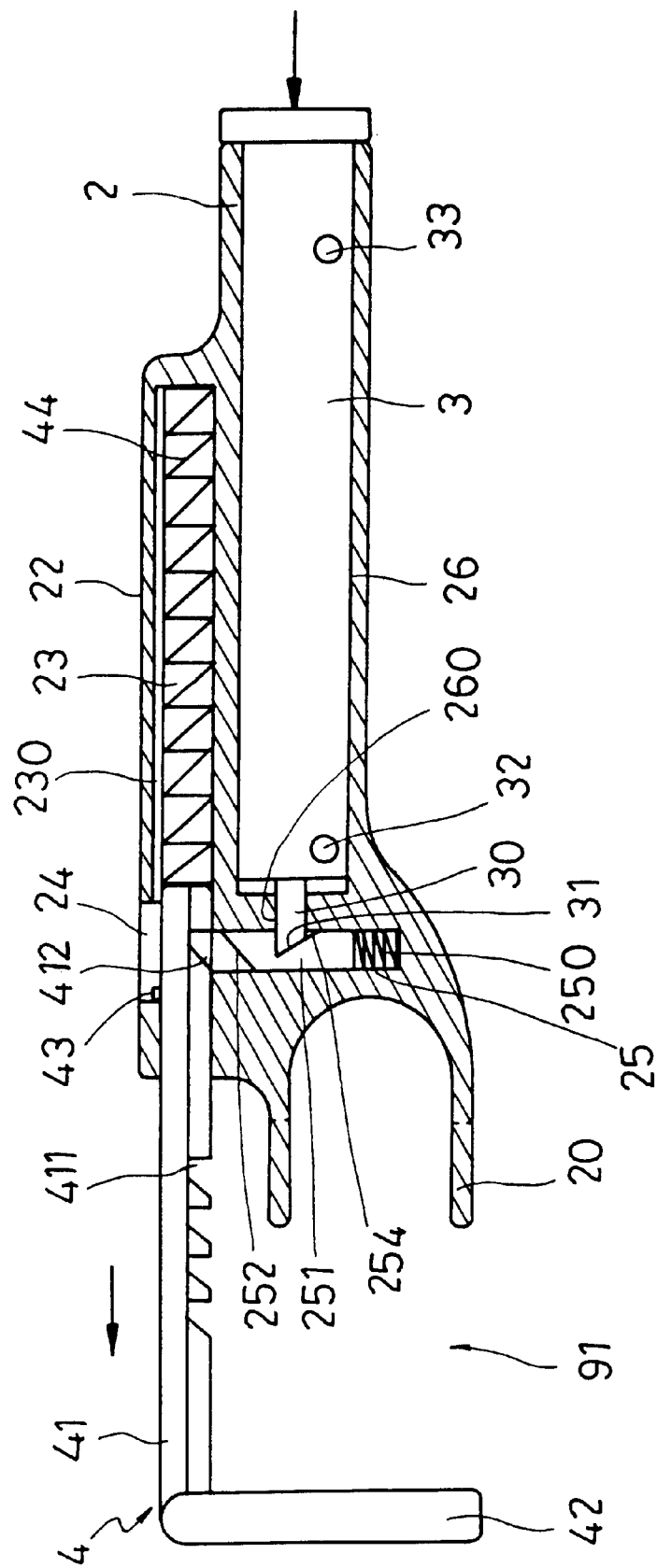
FIG. 5 is a schematic view of the automobile lock in the present invention, showing the ejecting rod being pushed inwardly along a chamber of the body and the retaining rod being pulled outwardly along a housing of the body.

Secondly, push the ejecting rod 3 inwardly along the chamber 26 to make the ejecting pin 30 of the ejecting rod 3 extended into the engagement notch 253 of the locating pin 251, as shown in FIG. 5, with the inclined plane 31 of the ejecting pin 30 touched against the inclined cut face 254 of the engagement notch 253 to make the locating pin 251 depressed downwards to compress the first spring 250 and disengaged from one of the plurality of engagement grooves 411 of the rod body 41 so that the retaining rod 4 may be urged outwardly under the resilience of the third spring 44, but still restrained from sliding off the passage 23 of the housing 22 because the projection 43 of the rod body 41 is stopped by a front wall of the through hole 24 of the housing 22.

Thirdly, shrink the ejecting pin 30 of the ejecting rod 3 out of the engagement notch 253 of the locating pin 251 so that the locating pin 251 may be urged upwards under the resilience of the first spring 250 to make the top of the locating pin 251 engaged in the locating engagement groove 412 of the rod body 41 so as to position the retaining rod 4 in place with the retaining member 42 of the retaining rod 4 released from the open slots 21 of the holding member 20 so as to form a gap 91 between the retaining member 42 and the holding member 20 for allowing a rim of an automobile steering wheel 90 to be received in the holding member 20.

Figure 6:
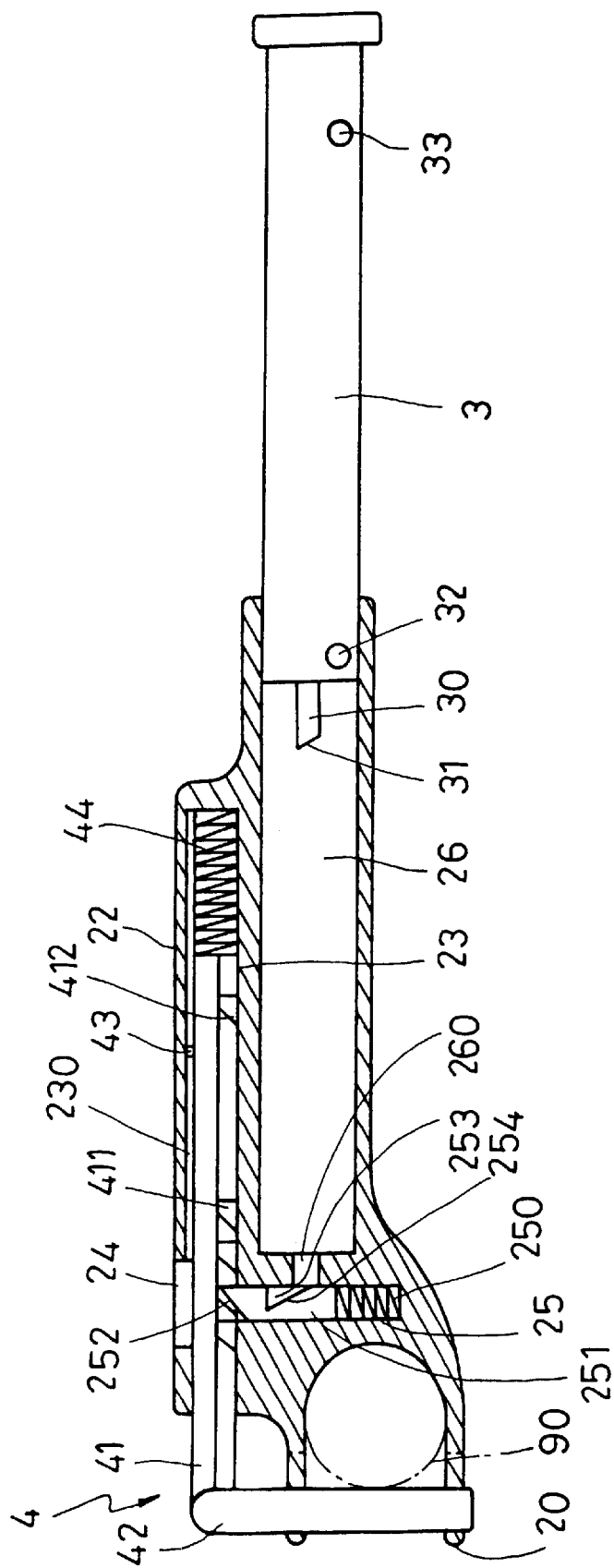
FIG. 6 is a schematic view of the automobile lock in the present invention, showing that a retaining member of the retaining rod and a holding member of the body coact to embrace a rim of an automobile steering wheel therein and that the ejecting rod is pulled outwardly along the body; and, FIG. 7 is a perspective view of the automobile lock in the present invention, showing the ejecting rod being pulled outwardly along the body and the retaining rod being withdrawn in the body.
Figure 7:
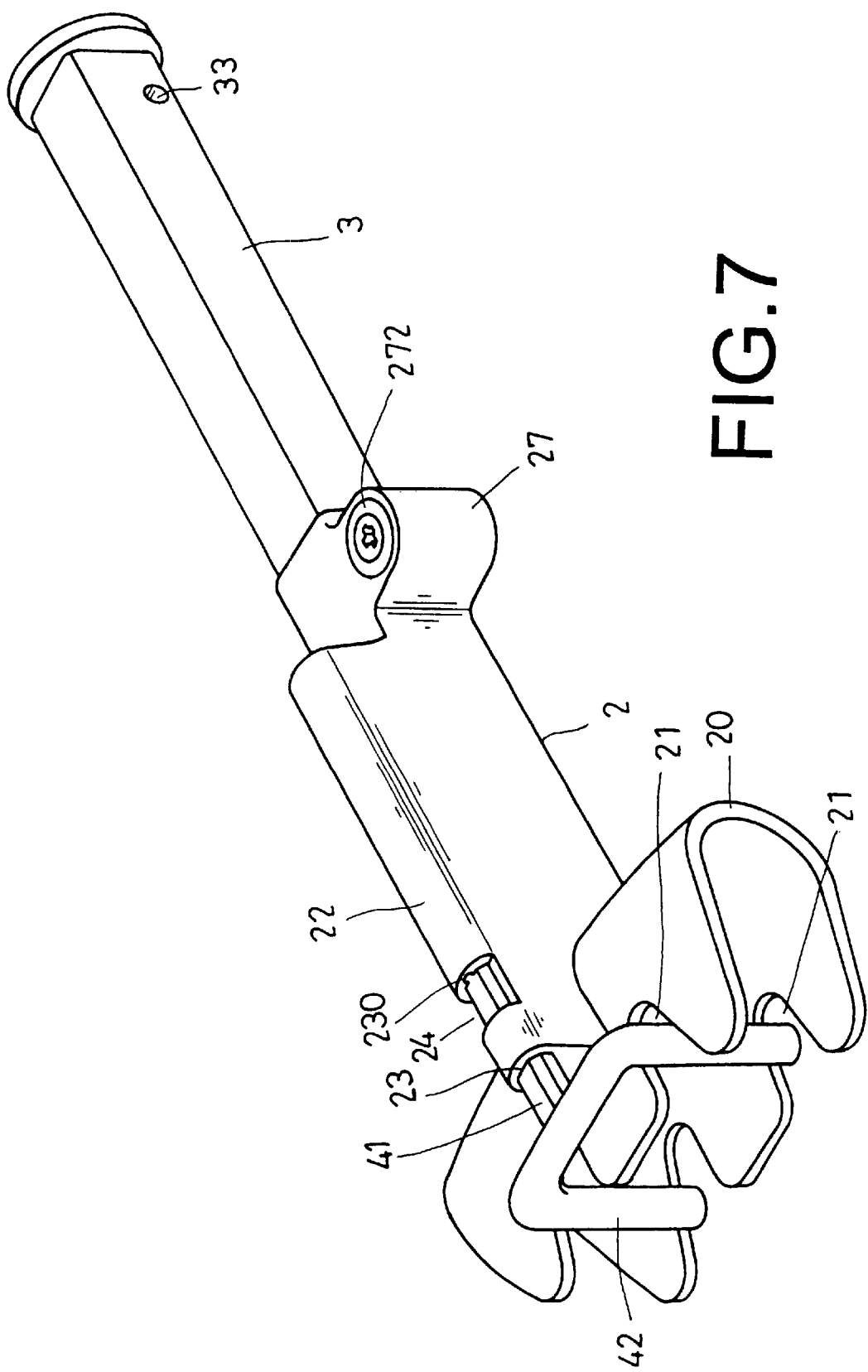

Fourthly, after the rim of the automobile steering wheel 90 is received in the holding member 20, push the retaining rod 4 inwardly further along the passage 23 of the housing 22 until the retaining member 42 is touched against the rim of the automobile steering wheel 90 so that the retaining rod 42 and the holding member 20 may coact to embrace the rim of the automobile steering wheel 90 therein, as shown in FIG. 6. The locating pin 251 is designed to have the top provided with the sloped surface 252 at one side thereof so that the retaining rod 4 is allowed to be pushed inwardly without a key, but restrained from being pulled outwardly without a key.

Finally, pull the ejecting rod 3 outwardly along the passage 23 to make the locking pin 275 engaged in the front engagement hole 32 of the ejecting rod 3 to fix the ejecting rod 3 in place without sliding inwards or outwards along the chamber 26, thus providing a secure lock on the automobile steering wheel 90 by limiting the rotation of the automobile steering wheel 90 so as to achieve an effect of anti-theft.

When not in use, firstly use a key (not shown) to rotate the lock core 272 to shrink the locking pin 275 to be disengaged from the rear engagement hole 33 of the ejecting rod 3 to be in an unlocked status for allowing the ejecting rod 3 to be withdrawn into the chamber 26.

Secondly, push the ejecting rod 3 slightly inwardly along the chamber 26 to make the ejecting pin 30 of the ejecting rod 3 extended into the engagement notch 253 of the locating pin 251 with the inclined plane 31 of the ejecting pin 30 touched against the inclined cut face 254 of the engagement notch 253 to make the locating pin 251 depressed downwards to compress the first spring 250 and disengaged from one of the plurality of engagement grooves 411 of the rod body 41 so that the retaining rod 4 may be urged outwardly under the resilience of the third spring 44.

Thirdly, shrink the ejecting rod 3 out of the locating pin 251 so that the locating pin 251 may be urged upwards under the resilience of the first spring 250 to make the top of the locating pin 251 engaged in the locating engagement groove 412 of the rod body 41 of the retaining rod 4 so as to position the retaining rod 4 in place with the retaining member 42 of the retaining rod 4 released from the open slots 21 of the holding member 20 so as to form the gap 91 between the retaining member 42 and the holding member 20 again for allowing the automobile lock to be removed from the rim of the automobile steering wheel 90.

Finally, after the automobile lock is removed from the rim of the automobile steering wheel 90, push the retaining rod 4 inwardly along the passage 23 of the housing 22 to make the retaining member 42 of the retaining rod 4 positioned in the open slots 21 of the holding member 20, and then withdraw the ejecting rod 3 into the chamber 26 of the body 2, as shown in FIG. 3, thereby reducing the automobile lock to a minimum dimension only occupying little space convenient for storage.

While the preferred embodiment of the invention has been described above, it will be recognized and understood that various modifications may be made therein and the appended claims are intended to cover all such modifications that may fall within the spirit and scope of the invention.

What is claimed is:

1. An automobile lock comprising:
    a body having a holding member disposed at a front end thereof, a housing disposed at an upper portion thereof, a pin hole disposed therein, a chamber disposed therein and a locking seat disposed at a rear portion thereof, said housing provided with a passage disposed therein and extending through a front end thereof as well as an opening disposed at an upper portion thereof in communication with said passage, said pin hole aligned with said opening of said housing and communicating with said passage of said housing, a first spring and a locating pin contained in said pin hole, said chamber extending through a rear end of said body and provided with a through hole disposed at a front end thereof in communication both with said chamber and said pin hole, said locking seat provided with a compartment disposed therein as well as a lock hole disposed at a sidewall thereof in communication with said chamber, a lock core contained in said compartment, a second spring and a locking pin contained in said lock seat;
    an ejecting rod capable of being extended into said chamber of said body, and having an ejecting pin disposed at a front end thereof and two engagement holes each respectively disposed adjacent said front end and a rear end of a sidewall thereof; and,
    a retaining rod capable of being extended into said passage of said housing of said body, and having a rod body and a retaining member disposed at a front end of said rod body, said rod body provided with a plurality of engagement grooves formed thereon as well as a locating engagement groove formed adjacent a rear end thereof, a third spring contained in said passage of said body for urging against said rear end of said rod body.

2. The automobile lock as claimed in claim 1, wherein said holding member of said body is provided with open slots formed thereon for the insertion of said retaining member of said retaining rod.

3. The automobile lock as claimed in claim 1, wherein said locating pin has a top provided with a sloped surface at one side thereof and a sidewall provided with an engagement notch disposed thereon, said engagement notch provided with an inclined cut face formed therein; wherein said ejecting pin of said ejecting rod has a front end designed to be an inclined plane for corresponding to said inclined cut face of said engagement notch of said locating pin.

4. The automobile lock as claimed in claim 1, wherein said lock core has a bottom provided with an actuating block protruded therefrom; wherein said locking pin is provided with an engagement slot disposed thereon.

5. The automobile lock as claimed in claim 1, wherein a slide way is disposed in one section of said passage of said housing of said body that is located behind said opening of said housing; wherein a projection is disposed on said rod body of said retaining rod and capable of moving forward or backward in said slide way of said passage by following the sliding movement of said rod body of said retaining rod, and said projection is capable of being stopped by a front wall of said opening of said housing when said retaining rod is pulled outwardly so as to prevent said rod body of said retaining rod from being pulled out of said passage of said housing.

\* \* \* \* \*